United States Patent [19]

Wafler

[11] Patent Number: 5,510,896
[45] Date of Patent: Apr. 23, 1996

[54] AUTOMATIC COPY QUALITY CORRECTION AND CALIBRATION

[75] Inventor: Walter F. Wafler, Rochester, N.Y.

[73] Assignee: Xerox Corporation, Stamford, Conn.

[21] Appl. No.: 77,904

[22] Filed: Jun. 18, 1993

[51] Int. Cl.[6] .................................................. G02B 26/10
[52] U.S. Cl. ........................... 358/296; 358/406; 355/208
[58] Field of Search ..................................... 358/504, 523, 358/524, 404, 406, 296, 444; 355/208

[56] References Cited

U.S. PATENT DOCUMENTS

| | | |
|---|---|---|
| 4,335,952 | 6/1982 | Conly et al. . |
| 4,627,721 | 12/1986 | Nguyen et al. . |
| 4,710,785 | 12/1987 | Mills . |
| 4,733,276 | 3/1988 | Kakitani . |
| 4,779,106 | 10/1988 | Mills . |
| 4,831,420 | 5/1989 | Walsh et al. . |
| 4,970,557 | 11/1990 | Masuda et al. . |
| 4,972,257 | 11/1990 | Birnbaum et al. . |
| 4,999,673 | 3/1991 | Bares . |
| 5,016,050 | 5/1991 | Roehrs et al. . |
| 5,030,989 | 7/1991 | Nakamura . |
| 5,107,299 | 4/1992 | Farrell et al. . |
| 5,138,377 | 8/1992 | Smith et al. . |
| 5,148,286 | 9/1992 | Knodt et al. . |
| 5,153,745 | 10/1992 | Brandkamp et al. . |
| 5,161,010 | 11/1992 | Birnbaum . |
| 5,200,958 | 4/1993 | Hamilton et al. . |
| 5,255,085 | 10/1993 | Spence .................................. 358/257 |
| 5,339,176 | 8/1994 | Smilansky et al. .................... 358/504 |
| 5,345,315 | 9/1994 | Shalit .................................... 358/406 |

*Primary Examiner*—Joeph W. Hartary
*Assistant Examiner*—Craig A. Hallacher
*Attorney, Agent, or Firm*—Oliff & Berridge

[57] ABSTRACT

A digital copier includes an automatic copy quality correction and calibration method that corrects a first component of the copier using a known test original before attempting to correct other components that may be affected by the first component. Preferably, a scanner subsystem is first calibrated by scanning a known original and electronically comparing the scanned digital image with a stored digital image of the original. A hard copy of a known test image is then printed by a printer subsystem and the calibrated scanner subsystem scans the hard copy. The scanned digital image is electronically compared with the test image and the printer subsystem is calibrated based on the comparison.

19 Claims, 8 Drawing Sheets

AUTOMATIC COPY QUALITY CORRECTION AND CALIBRATION

BACKGROUND OF THE INVENTION

1. Field of the Invention

The invention relates to a digital copier that incorporates automatic copy quality correction and calibration. A correction routine corrects a first component of the copier using a known test original before attempting to correct other components that may be affected by the first component.

2. Description of Related Art

In electronic reprographic printing systems, a document or series of documents comprising at least one print job are successively scanned. Upon scanning of the documents, image signals are obtained and electronically stored. The signals are then read out successively and transferred to a printer for formation of the images on paper. Once a document is scanned, it can be printed any number of times or processed in any number oil ways (e.g., words deleted or added, image magnified or reduced). If a plurality of documents comprise a job that is scanned, the processing or manipulation of the scanned documents can include deletion of one or more documents, reordering of the documents into a desired order, or addition of a previously or subsequently scanned document. The printing or processing can be relatively synchronous with scanning, or asynchronous after scanning.

If asynchronous, a time interval exists between scanning and printing or processing. The system can then accumulate a number of scanned jobs in, the system memory for subsequent processing or printing. The order of the jobs to be printed may be different from the order of the jobs as scanned depending on the priority of the jobs and the desires of the operator for increasing productivity or throughput and decreasing printer or scanner down time.

However, even electronic printing systems need occasional alignment or correction of copier components. Copy quality variation both within a reproduction machine and within a machine population is a major concern. Known methods of correction or calibration require extensive operator interaction or provide inadequate correction.

Over time and through extended use, the various subsystems of a copier, even digital copiers, gradually wear, become contaminated, or out of adjustment. Because so many of the subsystems such as the scanner, printer, and illumination subsystems are interrelated and dependent upon each other, errors or degradation of any of these components affects the operation and quality of the other components, usually propagating the errors. Due to this interrelationship, it is often difficult to determine the root cause of an error or to isolate one subsystem's error from affecting other components.

While numerous approaches to correction and calibration of copier operation are known, these usually require extensive trial and error analysis of components. For example, if a mirror or lens is out of focus, this affects the copy that is printed by the printer subsystem. Additionally, if an exposure level for a color is set incorrectly, it results in the printing of a wrong shade. From looking at the copy, it is difficult to determine whether a scanning component, a printing component or even other components relating to illumination such as a light caused the error.

Many calibration systems rely on an operator to visually compare copies with an original and to initiate a correction routine if any undesired properties are detected on the copies. This requires a trained eye and cannot readily ascertain minimal amounts of differences.

There is a need for a simple, automatic calibration method and system which can easily isolate and test individual components so that subsequent testing does not propagate errors from the tested components to untested components.

There also is a need for a reliable correction and calibration diagnostic system for a digital copier that relies on minimal operator assistance and utilizes the sophistication of digital technology to compare and calibrate various components of the copier.

OBJECTS AND SUMMARY OF THE INVENTION

It is an object of the invention to utilize the digital technology of a digital copier to compare and calibrate various subsystems of the copier.

It is another object of the invention to compare the digital representation of a known original with a digital representation of a scanned image of the known original to calibrate a scanner subsystem prior to testing of a printing subsystem to eliminate any error in the scanner subsystem from affecting the calibration of the printer subsystem.

The above and other objects are achieved by providing a digital copier capable of automatic copier calibration and correction having at least one adjustable process control parameter, comprising:

a scanner subsystem including a platen;

a printer subsystem;

a processor subsystem including a plurality of memory locations;

a pre-existing hard copy of an actual first known test image;

a first memory location for storing an electronic digital representation of the first known test image;

a second memory location for temporarily storing an electronic digital representation of a scanned image;

a third memory location for at least temporarily storing an electronic digital representation of a second known test image;

means for initiating scanning of the actual known hard copy;

means for storing electronic scanning data from the scanned known copy into the second memory location;

a comparator for electronically comparing data stored in the first and second memory locations and determining differences therebetween;

an adjustment circuit for adjusting operating parameters of the scanning subsystem based on the determined differences;

means for creating a hard copy printout of the second known test image;

means for initiating scanning of the hard copy printout;

means for storing electronic scanning data from the scanned hard copy printout in the second memory location;

a comparing circuit for comparing data from the third memory location and the second memory location and determining differences therebetween;

an adjustment circuit for adjusting parameters of the printer subsystem based on the determined differences.

The memory, scanner and computer sophistication or intelligence integrated into the new generation of digital copiers lends the copiers to automatically adjust and calibrate themselves. However, even with precise representations of values using digital storage and comparison techniques, unless components are calibrated when completely isolated from other components that may affect the calibration, this technology may not provide highly precise calibration. This is a problem remedied with this invention.

Because many variables aid in the cause or propagation of an error or misalignment, the inventive method iteratively solves or corrects one system component at a time and then uses the corrected component to further test and calibrate other components.

The method according to a preferred embodiment first tests and calibrates a scanning subsystem of the copier. This is accomplished by placing a known original on a document platen and scanning the known original using the scanning subsystem. Upon scanning, a scanned digital representation of the scanned known original is stored in a memory within the digital copier. Another memory within the digital copier has stored an actual digital representation of the known original.

A comparator within a processing section of the copier electronically compares any desired parameters of the scanned digital representation, with the actual digital representation. Any differences can be compensated for and calibrated to obtain a desired input/output transfer function for the scanner subsystem. Any of a number of parameters such as color intensity level, alignment, skew or magnification can be compared.

Once the subsystem is calibrated to a desired input/output transfer function, other subsystems of the copier can be calibrated. Preferably, the printer subsystem is next calibrated by printing a hard copy of a known test image. This can be performed using a test signal generator that sends a known digital representation of an image to the printer subsystem or can use the actual digital representation of the known original used above and already stored in memory. After the hard copy is printed, it is aligned on the document platen and scanned using the previously calibrated scanning subsystem. The scanned digital representation of the image is compared with the previously stored actual digital representation. Comparison of parameters of the scanned and actual representation takes place and if any differences are determined, the printer subsystem's input/output transfer function is calibrated to a desired value.

BRIEF DESCRIPTION OF THE DRAWINGS

The invention will be described in detail with reference to the following drawings wherein.

DETAILED DESCRIPTION OF PREFERRED EMBODIMENTS

Figure 1:
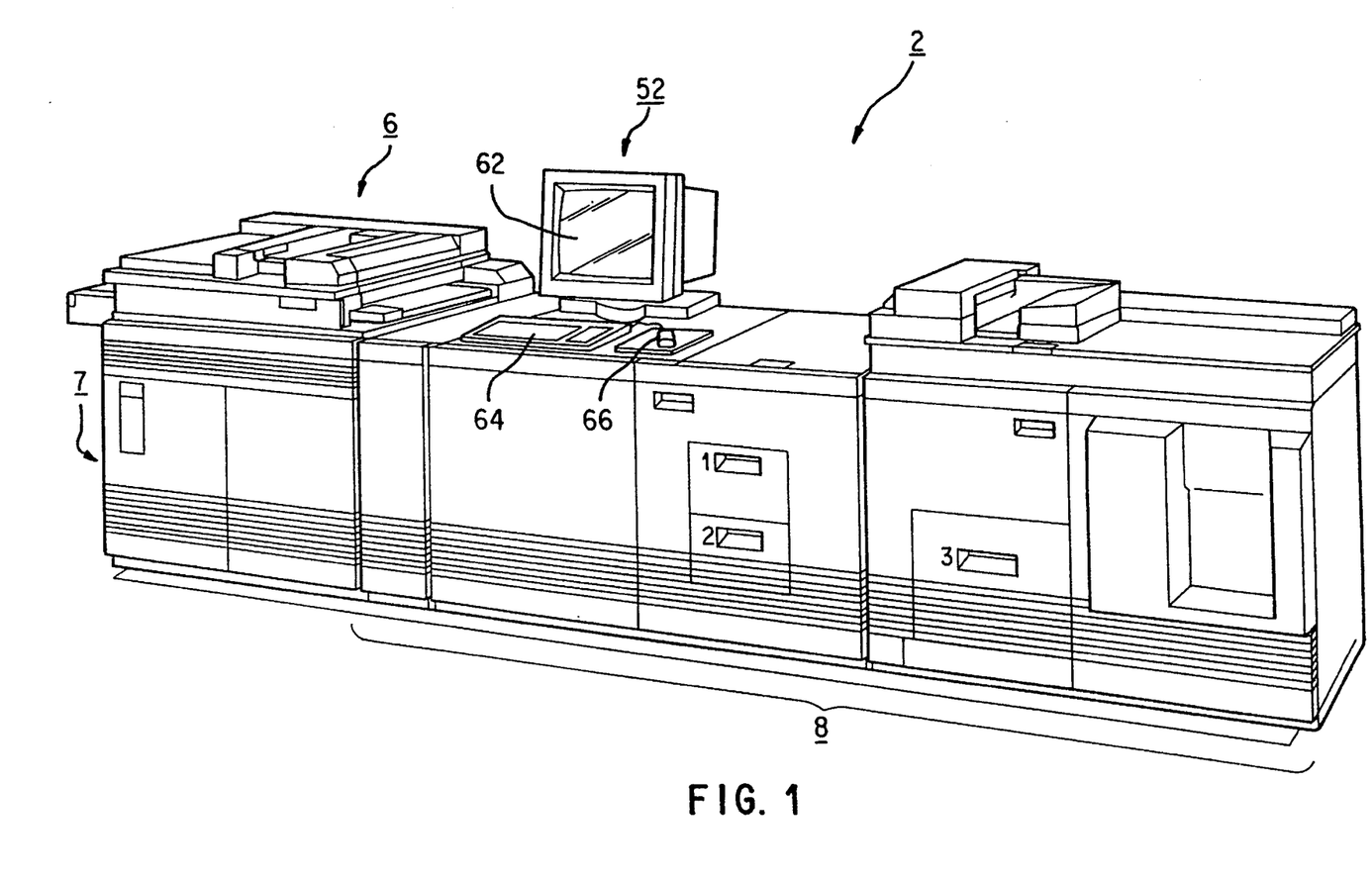
FIG. 1 is a view depicting an electronic copier according to the invention.
Figure 2:
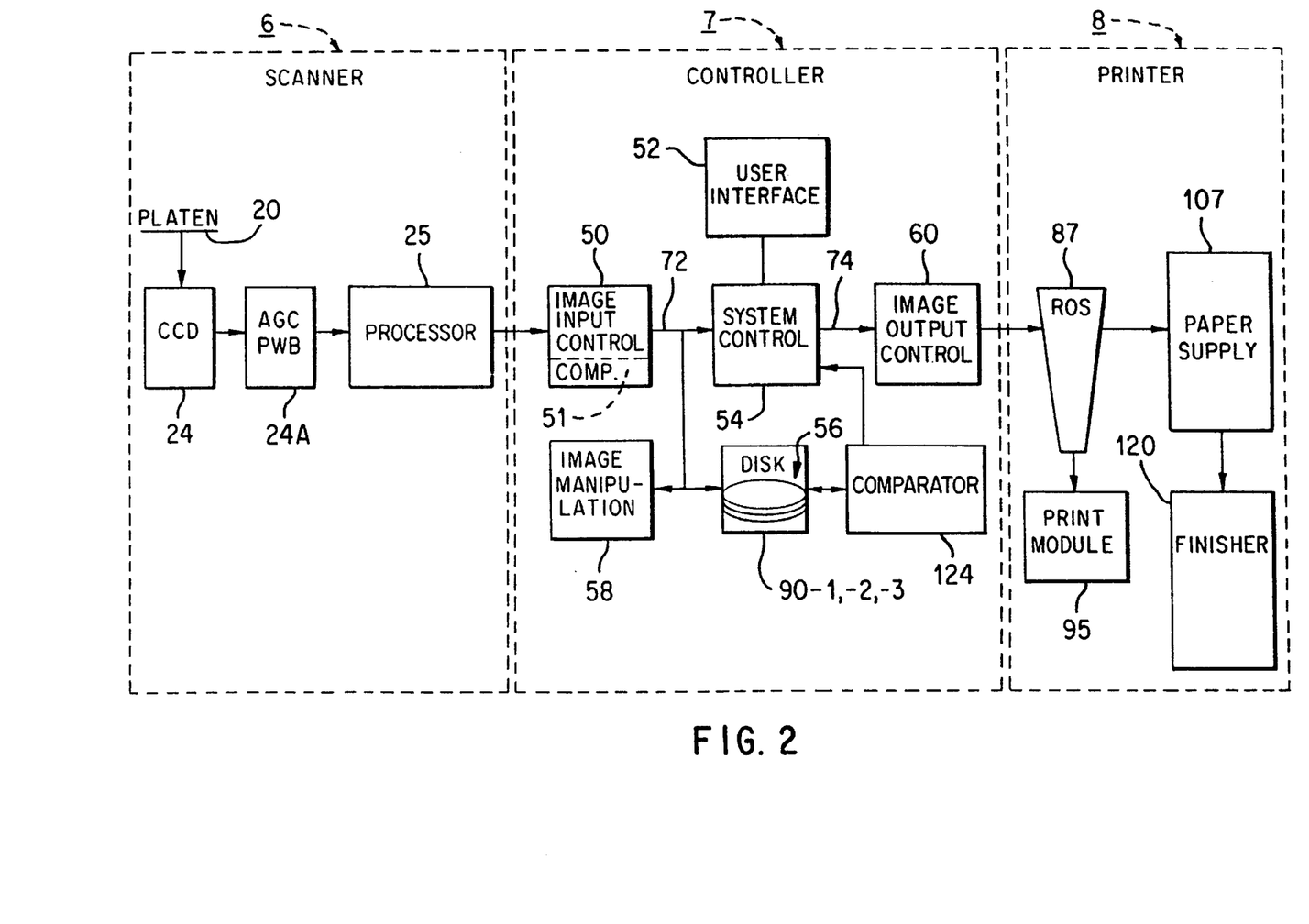
FIG. 2 is a block diagram depicting the major elements of the copier shown in FIG. 1.

Referring now to the drawings, and particularly to FIGS. 1 and 2, there is shown an exemplary laser-based one color (black) printing system 2 for processing print jobs in accordance with the teachings of the invention. Printing system 2, for purposes of explanation, is divided into a scanner section 6, controller section 7, and printer section 8. While a particular printing system is shown and described, the invention may be used with other types of printing systems that can provide digital capability.

Figure 3:
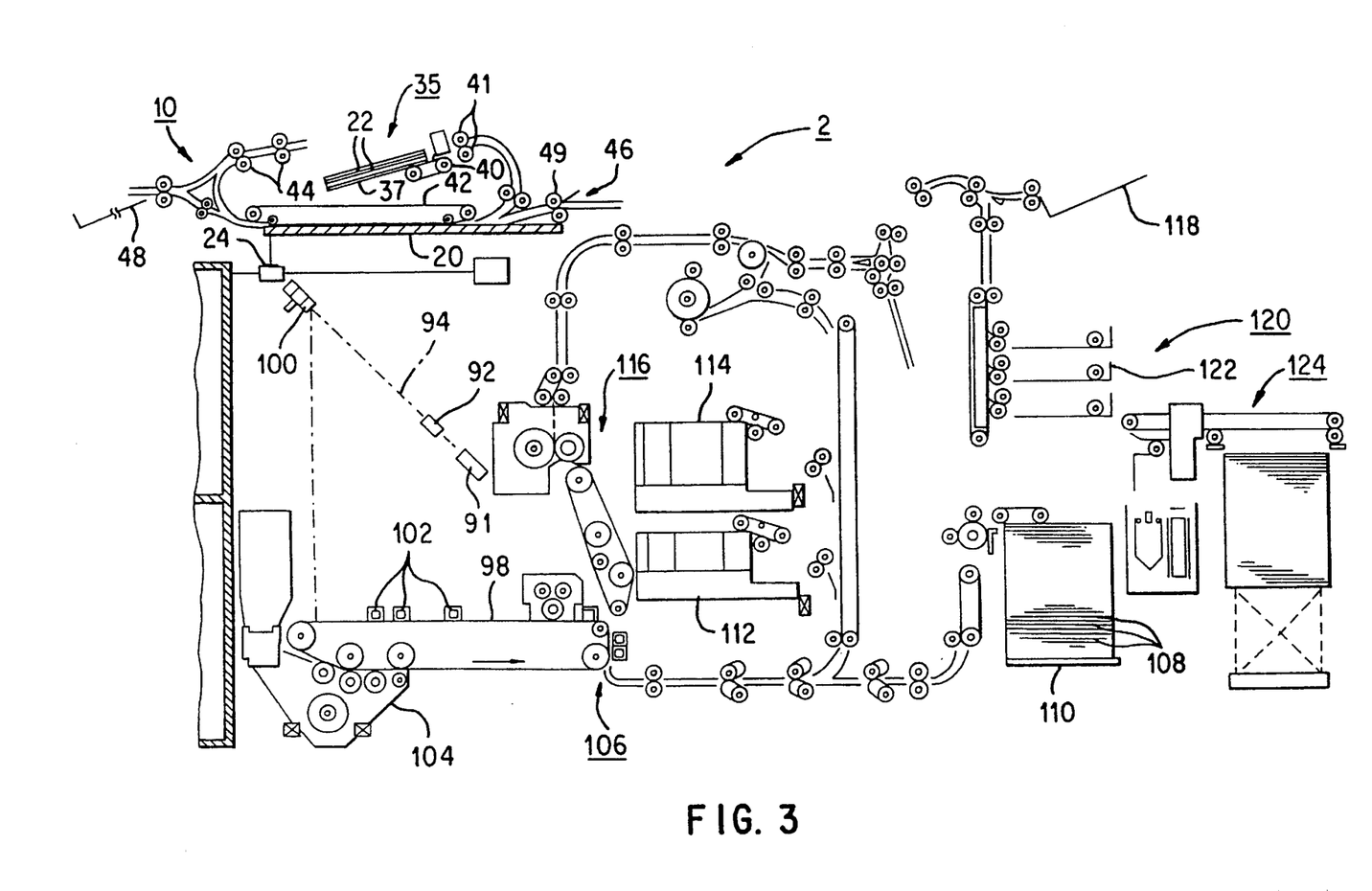
FIG. 3 is a plan view illustrating the principal mechanical elements of the copier shown in FIG. 1.
Figure 4:
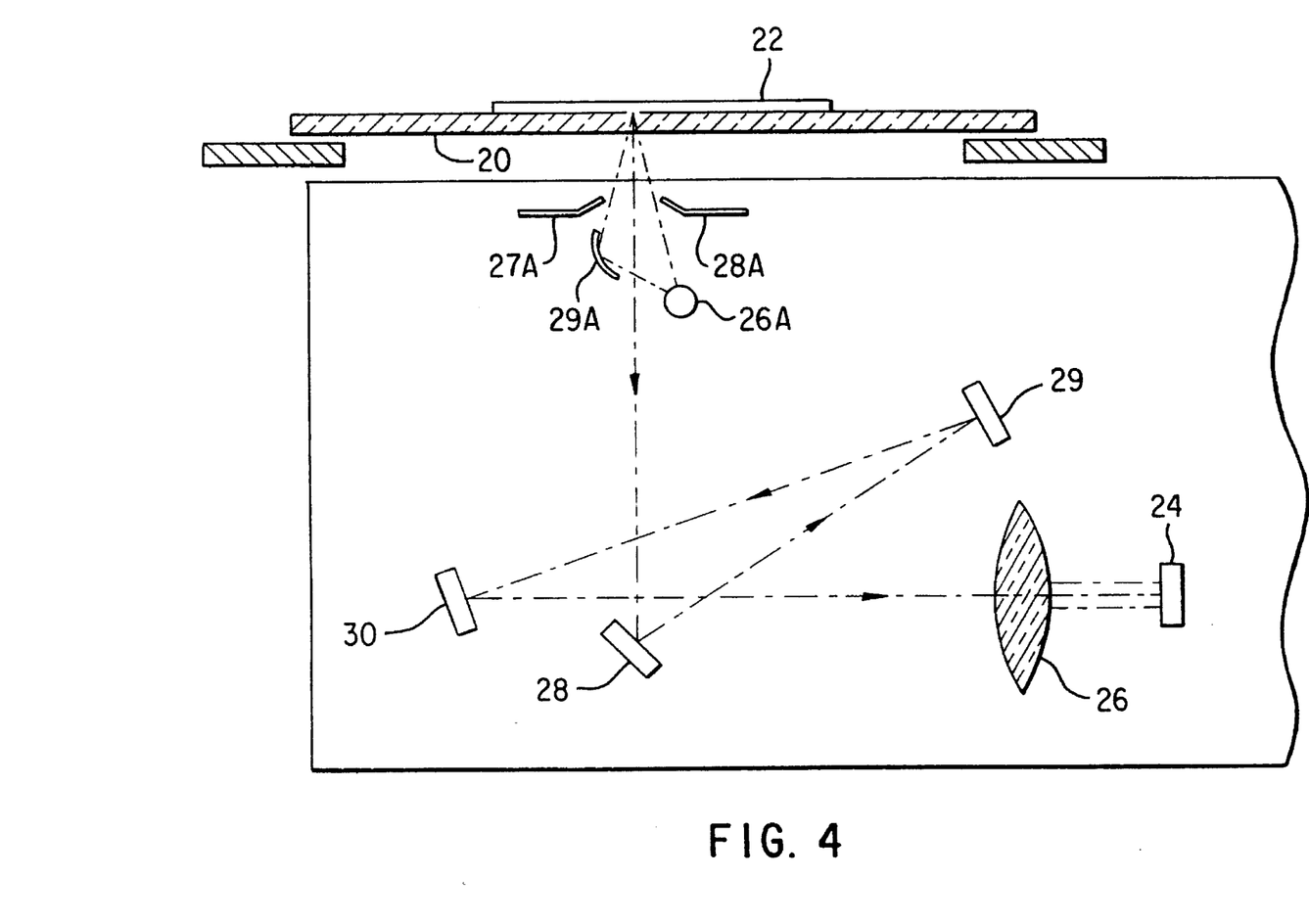
FIG. 4 is a schematic view illustrating details of a document scanner shown in FIG. 1.

Referring to FIGS. 2–4, scanner section 6 incorporates a transparent document platen 20 on which a document 22 to be scanned is located. One, or more linear arrays 24 are supported for reciprocating scanning movement below platen 20. Lens 26 and mirrors 28-30 cooperate with light source 26A, shadow masks 27A and 28A, and reflector 29A to focus array 24 on a line segment of platen 20 and the document thereon being scanned. Array 24 through automatic gain control provides image signals or pixels representative of the image scanned that, after suitable processing, are output to controller section 7.

Processor 25 converts the analog image signals output by array 24 to digital and processes the image signals as required to enable system 2 to store and handle the image data in a required form. Processor 25 can also provide enhancements and changes to the image signals such as filtering, thresholding, screening, cropping, or reduction/enlargement.

Documents to be scanned may be located on platen 20 by automatic document handler (ADF) 35 operable in either a recirculating document handling (RDH) mode or a semi-automatic document handling (SADH) mode. A manual mode is also provided. For RDH operation, document handler 35 has a document tray 37 having documents 22 arranged in stacks or batches. The documents 22 are advanced by vacuum feed belt 40, document feed rolls 41 and document feed belt 42 onto platen 20 where the document is scanned by array 24. Following scanning, the document is removed from platen 20 by belt 42 and returned to tray 37 by document feed rolls 44.

For operation in a SADH mode, a document entry slot 46 provides access to the document feed belt 42 between tray 37 and platen 20 through which individual documents 22 may be inserted manually for transport to platen 20. Feed rolls 49 behind slot 46 form a nip for engaging and feeding tile document to feed belt 42 and onto platen 20. Following scanning, the document 22 is removed from platen 20 and discharged into catch tray 48.

Referring to FIGS. 2-3, printer section 8 comprises a laser-type printer and, for purposes of explanation, is divided into a Raster Output Scanner (ROS) section 87, print module section 95, paper supply section 107, and finisher 120. ROS 87 has a laser 90, the beam of which is split into two imaging beams 94. Each beam is modulated in accordance with the content of an image signal input by acousto-optic modulator 92 to provide dual imaging beams 94. Beams 94 are scanned across a moving photoreceptor 98 of print module 95 by mirrored facets of a rotating polygon 100 to expose two image lines on photoreceptor 98 with each scan to create latent electrostatic images representing the image signal input.

Photoreceptor 98 is uniformly charged by corotrons 102 at a charging station prior to exposure by imaging beams 94. The latent electrostatic images are developed by a developer 104 and transferred at transfer station 106 to a print media 108 such as paper by a paper supply section 107. Media 108 can be of any size, shape or color. For transfer, the print media 108 is brought forward in timed registration with the developed image on photoreceptor 98 from either a paper tray 10 or from auxiliary paper trays 112 or 114. The developed image transferred to the print media 1(:)8 is permanently fused by fuser 116 and the resulting hard copy print is discharged to either output tray 118 or finisher 120. Finisher 120 includes a stitcher 122 for stitching or stapling the prints together to form books and a thermal binder 124 for adhesively binding the prints into books.

Figure 5A:
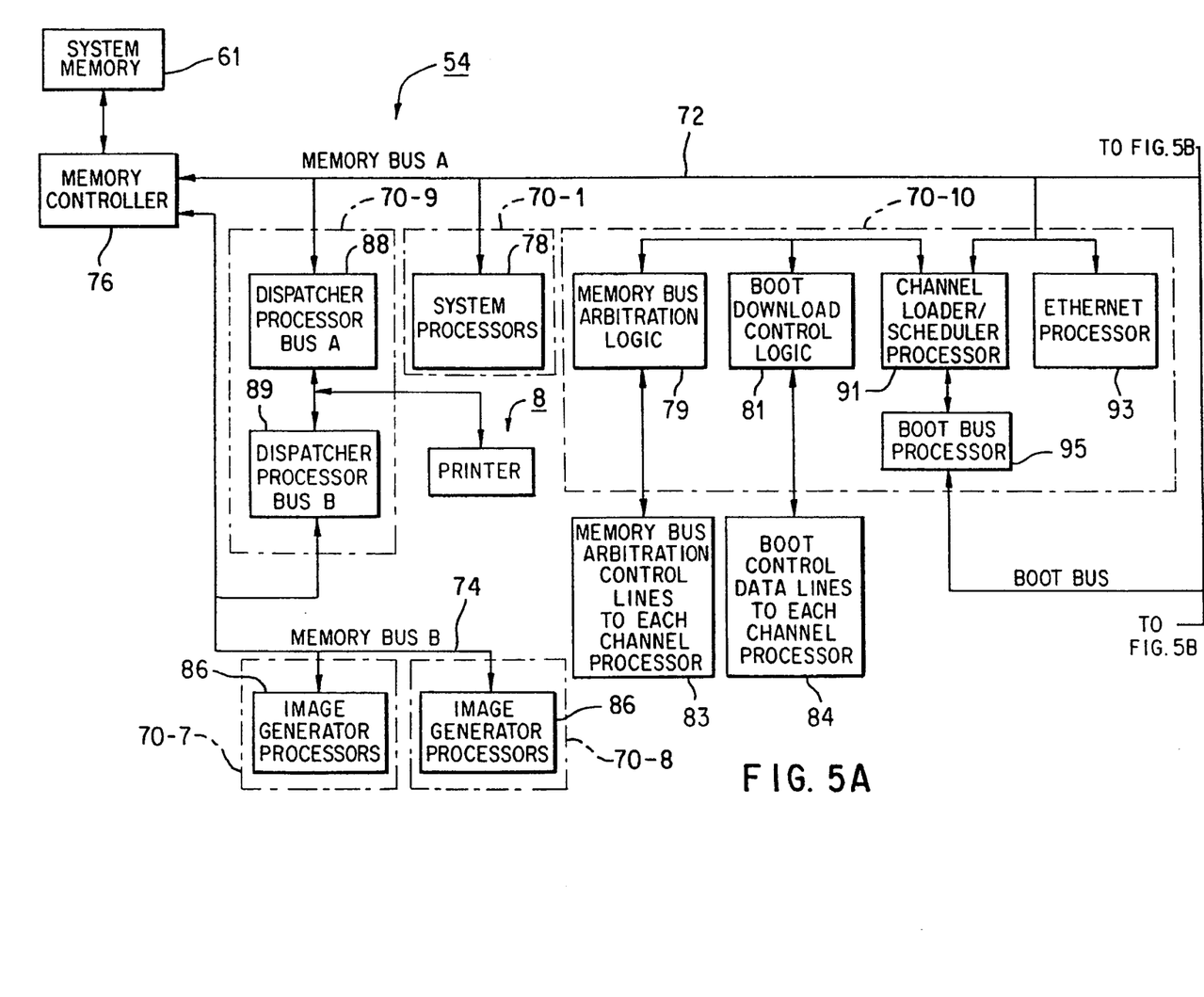
FIGS. 5A–5C show schematic block diagrams of the major parts of the control section for the copier in FIG. 1.
Figure 5B:
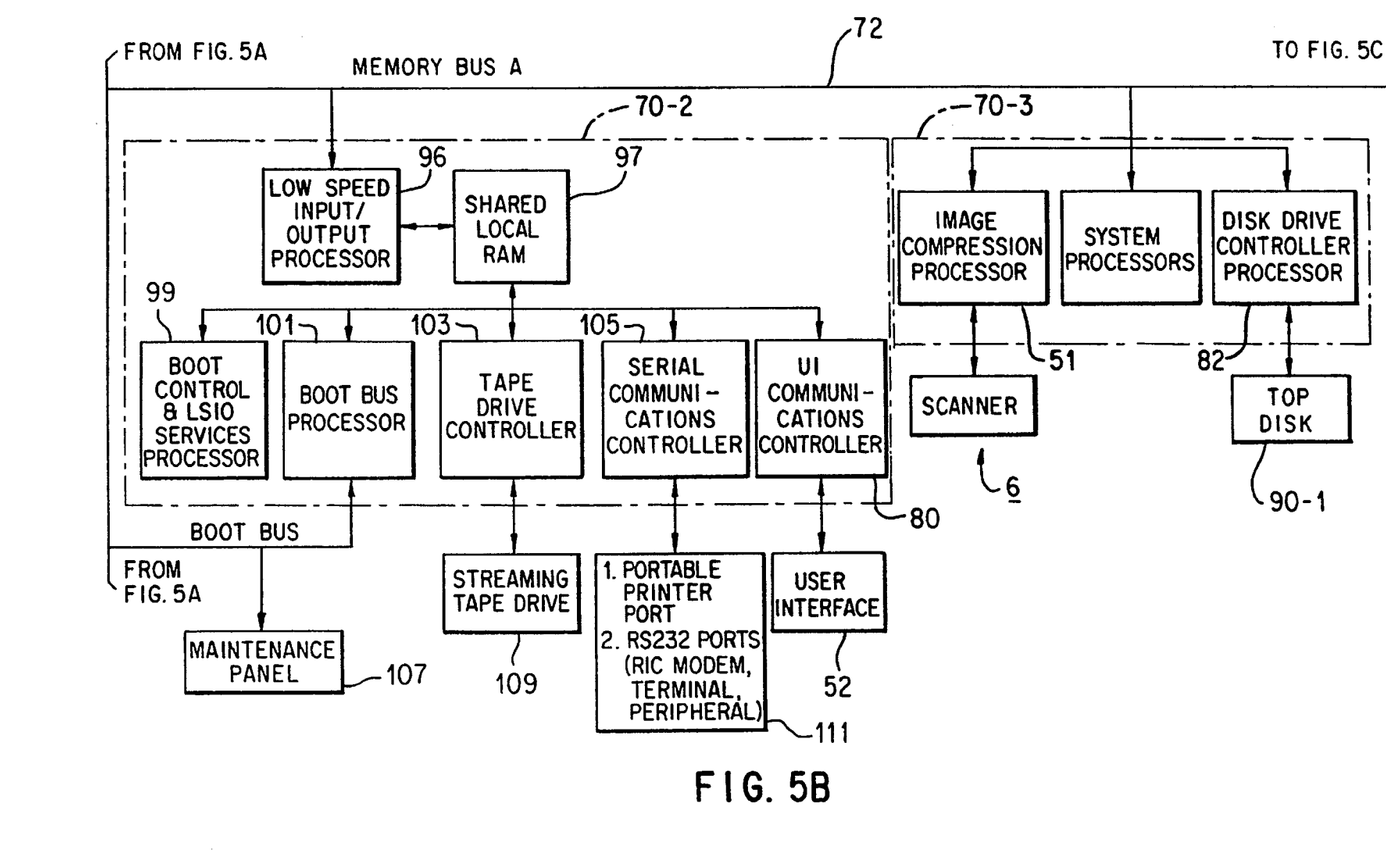
Figure 5C:
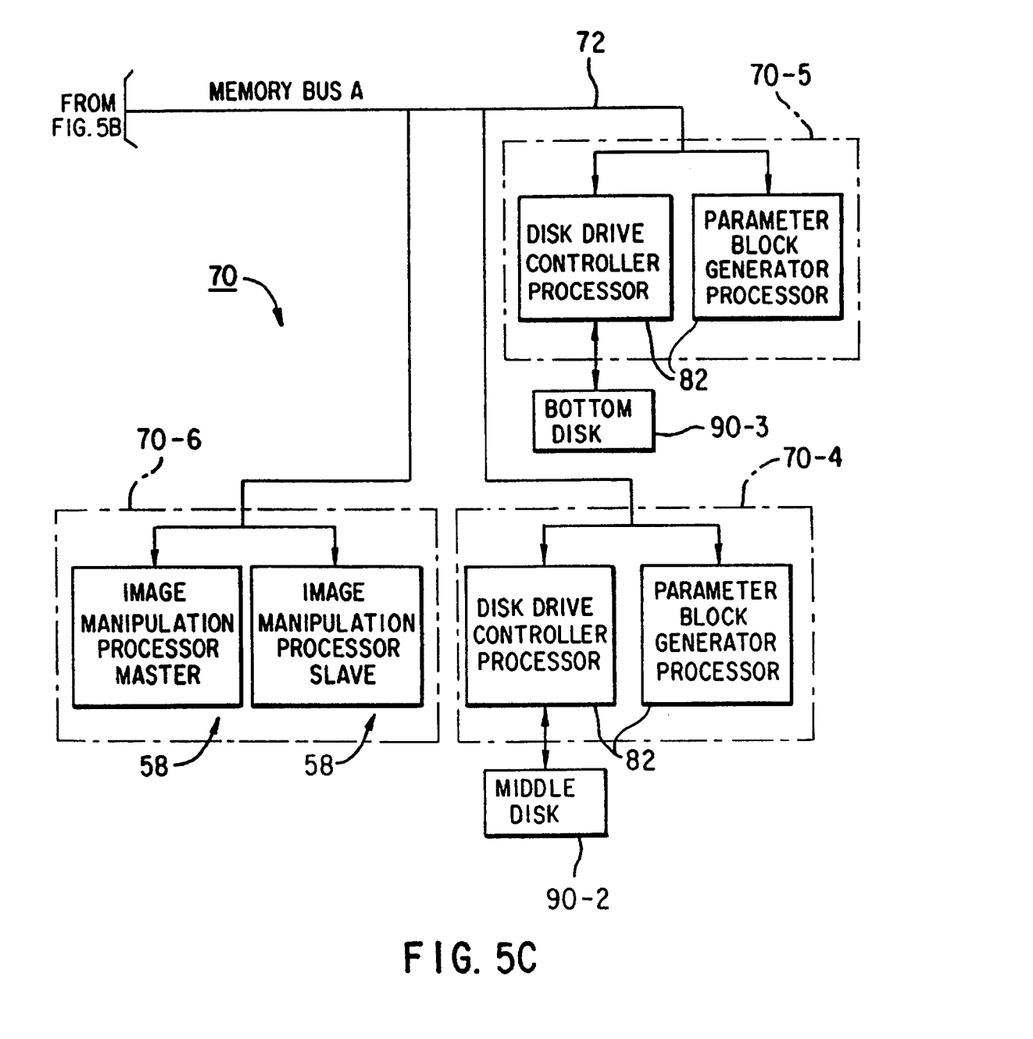

Referring to FIGS. 1,2 and 5, controller section 7 is divided into an image input controller 50, User Interface (UI) 52, system controller 54, main memory 56, image manipulation section 58, and image output controller 60.

Control section 7 includes a plurality of Printed Wiring Boards (PWB's) 70 coupled with one another and with system memory 61 by a pair of memory buses 72, 74. Memory controller 76 couples system memory 61 with buses 72., 74. PWB's 70 include system processor 70-1 having plural processors 78; low speed I/O processor PWB 70-2 having UI communication controller 80 for transmitting date to and from UI 52; PWB's 70-3, 70-4 and 70-5 having disk drive controller/processors 82 for transmitting data to and from disks 90-1, 90-2 and 90-3, respectively, of main memory 56; image manipulation PWB 70-6 with image manipulation processors of image manipulation section 58; image generation processor PWB's 70-7 and 70-8 with image generation processor 86 for processing the image data for printing by printer section 8; dispatch processor 70-9 having dispatch processors 88 and 89 for controlling transmission of data to and from printer section 8; and boot control arbitration scheduler PWB 70-10 which includes memory bus 79, boot down load control 81, memory bus 83, boot control 84, loader/processor 91, ethernet processor 93 and boot bus processor 95.

The scanned image data from processor 25 of scanner section 6 to controller 7 is compressed by image compressor 51 of image controller 50 on PWB 70-3. As the image passes through compressor 51, it is segmented into slices N scan lines wide, each slice having a slice pointer. The compressed image data together with slice pointers and any related image descriptors—such as height and width of the document in pixels, specific compression method used, and pointers—are placed in an image file. The image file is temporarily stored in system memory 61 at a specific memory location. The temporary memory may be a RAM pending transfer to main memory 56 where the data is held prior to use.

Main memory 56 has plural hard disks 90-1, 90-2, and 90-3 for storing machine operating system software, machine operating data, and the scanned image data currently being processed. It can also store numerous files having data relating to known diagnostic test images at various locations within memory 56.

As can best be seen in FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, programming information, diagnostic information, and calibration information. Items displayed on touchscreen 62 such as files and icons are actuated by either touching the displayed item on screen 62 with a finger or by using mouse 66 to point a cursor 67 to the item selected and keying the mouse.

When the compressed image data in main memory 56 requires further processing, or is required for display on UI 52, or required by printer section 8, the data is accessed in main memory 56. Further processing may also be accomplished by transferring the data to image manipulation section 58 where processing steps such as collation or decomposition are carried out. Following processing, the data may be returned to main memory 56, sent to UI 52, or sent to image output controller 60.

Image data output to image output controller 60 is decompressed and ready for printing by ROS 87 of printer section 8. Image data sent for printing is usually purged from memory 56 to make room for new data.

The, described digital copier incorporates an automatic correction and calibration routine that can be initiated on demand by the operator through UI 52 or can be automatically initiated by the digital copier upon detection of a discrepancy error above a predetermined threshold. Alternatively, the routine can be initiated after a predetermined amount of use or with the passage of a predetermined time period, such as monthly or biweekly depending on machine usage.

Specific problems or errors are isolated by the selection of input media. Scanner problems can be isolated by comparing the scanned image of a known calibration original to expected values. Once corrections are made to the scanner, the input to output of the scanner should be the same or to a known transfer function. Thus, errors in the scanner are now corrected and will not propagate error to other parts of the system. Once corrections are made to the scanner, the printer portion can be set up in a similar manner. The copier prints a copy of a known original. The copy is scanned and compared with the expected image. Now the printer is corrected to correct the I/O transfer function.

Once the printer section is correct, other variables can be checked and calibrated. For example, geometric setups such as image to paper alignment, deletion setups, reduction and magnification corrections can be made using edge detection comparisons instead of level comparisons.

Figure 6:
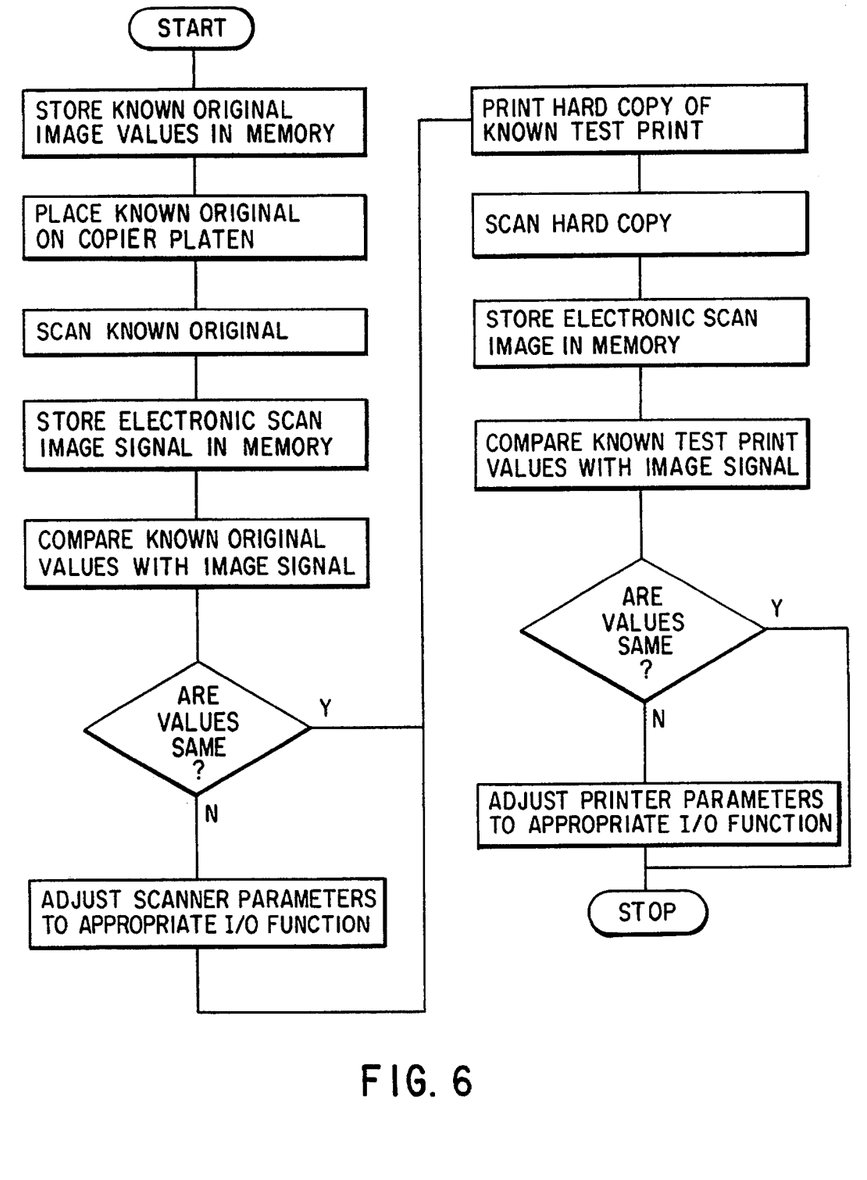
FIG. 6 is a flow chart of calibration steps according to a preferred embodiment of the invention.

A preferred embodiment is better described with reference to FIG. 6. Once the routine is initiated, the routine first tests and calibrates a scanning subsystem 6 of the copier. This is accomplished by placing a known test original on document platen 20 and scanning the known original using the scanning subsystem 6. Upon scanning, a scanned digital representation of the scanned known original is stored in memory 56 at a predetermined location within the digital copier. Another memory location, such as in main memory 56 within the digital copier, has stored an actual digital representation of the known original.

The actual electronic representation stored may have been electronically generated by the digital copier or any other machine and stored within the digital copier. The known test original hard copy may have been printed using a calibrated printer subsection of a copier or any other machine that is completely calibrated to provide a hard copy that completely matches the electronic representation. This enables expected values that are accurately represented. However generated, the hard copy original is a known original that has predetermined values for testing purposes and the digital copier has an electronic representation stored in memory that precisely corresponds to the predetermined values of the hard copy for comparison purposes.

A comparator section 124 within processing subsystem 7 of the digital copier compares any desired parameters of the scanned digital representation with the actual digital representation. Any differences can be compensated for and calibrated to obtain a desired input/output transfer function for the scanner subsystem 6. Any of a number of parameters such as image density (either B&W or color), linearity, background and image registration, margin adjustments or magnification can be compared. These adjustments can be performed automatically by the system or the system can notify the operator or repair technician, such as through UI 52, as to which subsystem is at fault and the parameter that is out of adjustment, as well as any information relating to the amount of correction or adjustment needed.

Once the scanning subsystem 6 is calibrated to a desired input/output transfer function, other subsystems of the copier can be calibrated. Preferably, the printer subsystem 8 is next calibrated by printing a hard copy of a known test image. This can be performed using a test signal generator that sends a known digital representation of an image to the printer subsystem 8 or can use the actual digital representation of the known original used in the scanning subsystem testing and already stored in memory, having expected test values. After the hard copy is printed, it is aligned on document platen 20 and scanned using the previously calibrated scanning subsystem 6. The aligning of the hard copy on document platen 20 can be performed manually and aligned with various alignment marks on platen 20. Preferably, this is performed manually to isolate any document transport misalignment from affecting calibration of printer subsystem 8.

The scanned digital representation of the image is compared with the previously stored actual digital representation. Electronic comparison of parameters of the scanned and actual representation takes place using comparator 124 and if any differences are determined, the printer subsystem's input/output transfer function is calibrated to a desired value. This is possible because the copier can calculate the difference between the input and output of the system at various points forming a standard closed loop control system. Any adjustments needed may be automatically calibrated by the system or alerted to an operator or repair technician through UI 52.

Then, an automatic document transporting subsystem can be tested by placing a known original or the previously produced hard copy on input tray 37 within the copier for receiving originals. This can be transported to document platen 20 by the transport subsystem and scanned by the previously calibrated scanner subsystem 6. Previously stored digital representations of the original can be compared with the scanned representation and timing or registration of the transport subsystem can be adjusted or calibrated to a desired input/output transfer function.

Other functions such as copy margins, deletions, set-ups or image shifts can be compared and calibrated using the above iterative calibration process.

Optionally, the calibration step for each subsystem may be iterative. This may be desirable if many variables within the subsystem require adjustment, if large misalignments are determined, or if a feedback loop is desired to ensure that the transfer function is appropriate.

Besides use with the exemplary one color digital copier described, the; invention is even more suited for use with a color digital copier. A preferred color copier is described in U.S. Pat. Nos. 4,972,257 and 5,161,010, to Birnbaum et al. and Birnbaum, respectively, the contents of which are incorporated herein in their entirety.

In multi-color copying, a multi-colored document is scanned and converted to digital signals corresponding to the respective densities of red, green and blue (RGB). These signals are converted to a CIE space and stored. Prior to printing, the signals are manipulated to cyan, yellow, magenta and/or black (CYMK) and printed one color at a time by separate developer stations.

Because full color processing involves more steps and color representation has more variables (darkness, saturation, hue, contrast) than black printing, the inventive copy quality correction and calibration routine is even more necessary to maintain good image quality. Besides the color adjustments, there may also be errors in image misregistration of one or more colors relative to the other colors. This can distort and decrease the quality of the image. There also is the manipulations of one color space to, another (RGB to CYM(K)) that may be additional sources of miscalibration.

With a color copier, the inventive apparatus and method works substantially the same as in the one color (black) example. First, the scanning subsystem is calibrated by placing a known original on the document platen and scanning the known original using the scanning subsystem. Because full color is being calibrated, the known original may contain a test image with portions of at least the basic colors Red, Green and Blue, a test image with more than the basic colors, or separate test images each having a different color. In the last example, the testing process would be iterative. A single color would be scanned, compared and calibrated as previously discussed. Then a subsequent test image of a different color would be scanned, compared and calibrated. This would continue until all desired colors have been calibrated in the scanner subsystem. Any desired parameters can be compared and calibrated. For example, color intensity level, alignment, saturation, hue, contrast, magnification or skew.

Once the scanner subsystem is calibrated, the printer subsystem is calibrated. This is performed by printing a hard copy of a known test image that is stored in memory (RAM in the case of the preferred exemplary color copier). As with the scanning subsystem, the test image may be of full color, or multiple test images, each of a different color, may be provided to calibrate the printer subsystem. In the latter, an iterative printing, scanning, comparison, and calibration process takes place to calibrate the printer subsystem for all colors CYM(K).

Once the hard copy (or copies) is produced, it is aligned on the document platen and scanned using the previously calibrated scanner subsystem. The scanned digital representation of the image is compared with the known test image values already stored in memory. Any differences are determined, and the printer subsystem's I/O transfer function is calibrated to a desired output. Calibration parameters can include the same as in the scanner calibration and can additionally calibrate misregistrations of a particular color caused by document transport errors that may occur. This is more likely to occur in a full color copy because the image is not formed as a single image, but rather is formed by successive latent images superimposed in registration.

By judicious choice of calibrated test patterns and prints, it is possible to eliminate complex system color interactions normally found in multi-pass color reproducing systems.

The invention has been described with reference to the preferred embodiments thereof, which are illustrative and not limiting. Various changes may be made without departing from the spirit and scope of the invention as defined in the appended claims.

What is claimed is:

1. A method of calibrating a digital copying machine including a scanner subsystem, a printer subsystem, and a processor subsystem having at least one CPU and storage means, the method comprising the steps of:

(a) storing electronic values relating to a known original image into a first memory of the processor subsystem;

(b) scanning the known original using the scanner subsystem, generating an electronic scanned image representation in a temporary second memory;

(c) comparing contents of the first memory with contents of the second memory to determine error coefficients using the processor subsystem;

(d) adjusting scanning parameters to calibrate the scanner subsystem based on error coefficients determined in step (c);

(e) obtaining an electronic test print image of a second known original in a third memory;

(f) printing a copy of a known original with the printer subsystem;

(g) scanning the copy printed in step (f) using the scanning subsystem calibrated in step (d), generating a scanned electronic image representation in the temporary second memory;

(h) comparing contents of the third memory with contents of the second memory to determine error coefficients using the processor subsystem; and (i) adjusting printing parameters to calibrate the printer subsystem based on error coefficients determined in step (h).

2. The calibration method of claim 1, wherein step (e) involves generating the electronic image from an electronic image generator.

3. The calibration method of claim 1, wherein the first known original and the second known original are the same.

4. The calibration method of claim 1, wherein steps (c) and (h) compare image density levels.

5. The calibration method of claim 1, wherein steps (c) and (h) compare edge detections to calibrate alignment.

6. The calibration method of claim 1, wherein steps a–d are iterative until a desired transfer function for the scanner subsystem is achieved.

7. The calibration method of claim 1, wherein steps e–i are iterative until a desired transfer function for the scanner subsystem is achieved.

8. The method of claim 1, wherein steps (c) and (h) compare one or more parameters selected from the group of image alignment, image skew and image magnification.

9. A digital copier capable of automatic copier calibration and correction having at least one adjustable process control parameter, comprising:

a scanner subsystem including a platen;

a printer subsystem;

a pre-existing hard copy of a first known test image;

a processor subsystem including a plurality of memory locations including a first memory location for storing an electronic digital representation of the first known test image, a second memory location for temporarily storing an electronic digital representation of a scanned image, and a third memory location for at least temporarily storing an electronic digital representation of a second known test image;

means within the scanner subsystem for initiating scanning of the pre-existing hard copy;

means within the processor subsystem for storing electronic scanning data obtained from the scanning of the hard copy into the second memory location;

a comparator within the processor subsystem for electronically comparing data stored in the first memory location and the second memory location and determining differences therebetween;

an adjustment circuit within the processor subsystem for adjusting operating parameters of the scanning subsystem based on differences determined by the comparator;

means within the printer subsystem for creating a hard copy printout of the second known test image;

means within the scanner subsystem for initiating scanning of the hard copy printout after the scanning subsystem has been adjusted;

means within the processor subsystem for storing electronic scanning data obtained from the scanning of the hard copy printout in the second memory location;

a comparing circuit within the processor subsystem for comparing data from the third memory location and the second memory location and determining differences therebetween; and an adjustment circuit within the processor subsystem for adjusting parameters of the printer subsystem based on differences determined by the comparing circuit.

10. The digital copier of claim 9, wherein the second known test image has defined predetermined patterns and predetermined shading.

11. The digital copier of claim 10, wherein the shading is multi-colored.

12. The digital copier of claim 9, wherein the hard copy and the first memory location include representation of a test image having defined predetermined patterns representing shapes and predetermined shading levels within the image.

13. The digital copier of claim 12, wherein the predetermined shading levels are multi-colored.

14. The apparatus of claim 9, wherein said first memory location and said third memory location are at a same location.

15. The apparatus of claim 9, wherein said first memory location and said third memory location contain a same known test image.

16. The apparatus of claim 9, wherein said first memory location and said third memory location contain a different known test image.

17. A method of calibrating a color digital copying machine including a scanner subsystem, a printer subsystem, multiple developer stations having different colors and a processor subsystem having at least one CPU and storage means, the method comprising the steps of:

(a) storing electronic values relating to a known color original image into a first memory of the processor subsystem;

(b) scanning the known color original image using the scanner subsystem, generating an electronic scanned image representation in a temporary second memory;

( c ) comparing contents of the first memory with contents of the second memory to determine error coefficients using the processor subsystem;

(d) adjusting scanning parameters to calibrate the scanner subsystem based on error coefficients determined by step (d);

(e) obtaining an electronic test print image of a second known original in a third memory;

(f) printing a copy of the second known original with the printing subsystem;

(g) scanning the copy using the scanning subsystem, generating a scanned electronic image representation in the temporary second memory;

(h) comparing contents of the third memory with contents of the second memory to determine error coefficients using the processor subsystem; and (i) adjusting printing parameters to calibrate the printer subsystem based on error coefficients determined by step (h).

18. The method of claim 17, wherein steps e–i are iterative.

19. The method of claim 18, wherein multiple electronic test print images are obtained, each of a different color and steps f–i are performed for each test print image to calibrate each different color separately.

* * * * *